United States Patent
Francis et al.

(10) Patent No.: US 9,458,996 B2
(45) Date of Patent: Oct. 4, 2016

(54) ILLUMINATED POWER TOOLS WITH SWITCH LOCKING ARRANGEMENT

(71) Applicants: Robert Bosch Tool Corporation, Broadview, IL (US); Robert Bosch GmbH, Stuttgart (DE)

(72) Inventors: Noel Francis, Skokie, IL (US); Brady Groth, Chicago, IL (US); Marco Laubach, Wheeling, IL (US); John DeCicco, Elmhurst, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 14/103,239

(22) Filed: Dec. 11, 2013

(65) Prior Publication Data
US 2014/0160729 A1     Jun. 12, 2014

Related U.S. Application Data

(60) Provisional application No. 61/735,584, filed on Dec. 11, 2012.

(51) Int. Cl.
*H01H 9/20* (2006.01)
*F21V 23/04* (2006.01)
(Continued)

(52) U.S. Cl.
CPC ............... *F21V 23/04* (2013.01); *B23D 59/00* (2013.01); *B25F 5/021* (2013.01); *F21V 33/0084* (2013.01)

(58) Field of Classification Search
CPC     F21W 2131/403; B27B 11/00; B25B 23/18; B23D 45/16; B23D 47/00; H01H 2231/048; H01H 9/223
USPC ........................................................ 362/119
See application file for complete search history.

(56) References Cited

U.S. PATENT DOCUMENTS 3,356,814 A * 12/1967 France, Jr. ............. H01H 13/08
                                                    200/522
3,422,296 A *  1/1969 Frank .................... H01H 9/063
                                                    200/332.2

(Continued)

FOREIGN PATENT DOCUMENTS

| JP | 11170203 A | 6/1999 |
| JP | 2002316302 A | 10/2002 |
| JP | 2005335005 A | 12/2005 |

OTHER PUBLICATIONS

International Search Report and Written Opinion corresponding to PCT Application No. PCT/US2013/074454, mailed Apr. 11, 2014 (9 pages).

*Primary Examiner* — Ismael Negron
(74) *Attorney, Agent, or Firm* — Maginot Moore & Beck LLP

(57) ABSTRACT

A power tool includes a working element, a motor, a motor actuator, a housing, a light emitting element, a locking element, and a switch element positioned between the housing and the locking element. The housing supports the motor, the motor actuator, and the light emitting element and movably supports the locking element. The light emitting element illuminates a work area around the working element, and the motor drives the working element when actuated by the motor actuator. The locking element enables operation of the motor actuator when in an unlocked position and prevents operation of the motor actuator when in a locked position. When in the unlocked position, the locking element operates the switch element to activate the light emitting element.

16 Claims, 5 Drawing Sheets

(51) Int. Cl.
  *F21V 33/00*  (2006.01)
  *B23D 59/00*  (2006.01)
  *B25F 5/02*  (2006.01)

(56) References Cited

U.S. PATENT DOCUMENTS

| | | | |
|---|---|---|---|
| 3,662,136 A * | 5/1972 | Bienwald | H01H 13/62 200/318 |
| 4,050,003 A * | 9/1977 | Owings | B25F 3/00 219/240 |
| 5,461,790 A * | 10/1995 | Olstowski | B23Q 17/24 30/390 |
| 6,153,838 A * | 11/2000 | Wadge | H01H 3/20 200/334 |
| 6,318,874 B1 | 11/2001 | Matsunaga | |
| 6,340,802 B1 * | 1/2002 | Bascom | H01H 3/20 200/321 |
| 6,511,200 B2 | 1/2003 | Matsunaga | |
| 6,512,188 B2 * | 1/2003 | Campbell | H01H 3/20 200/321 |
| 7,020,970 B1 | 4/2006 | Welch | |
| 7,658,501 B2 * | 2/2010 | Niemann | B23D 59/003 362/119 |
| 7,918,030 B2 | 4/2011 | Fukuoka | |
| 8,186,067 B2 * | 5/2012 | Onose | B23D 45/16 30/371 |
| 8,550,320 B2 * | 10/2013 | Nakano | B25D 1/008 227/130 |
| 8,723,060 B2 * | 5/2014 | Parrinello | B25F 5/00 200/332.2 |
| 2002/0131267 A1 | 9/2002 | Van Osenbruggen | |
| 2005/0278959 A1 | 12/2005 | Nishimiya et al. | |
| 2007/0107235 A1 | 5/2007 | Mok | |
| 2010/0325903 A1 * | 12/2010 | Patel | B23D 45/122 30/377 |
| 2011/0127941 A1 | 6/2011 | Hirabayashi et al. | |

* cited by examiner

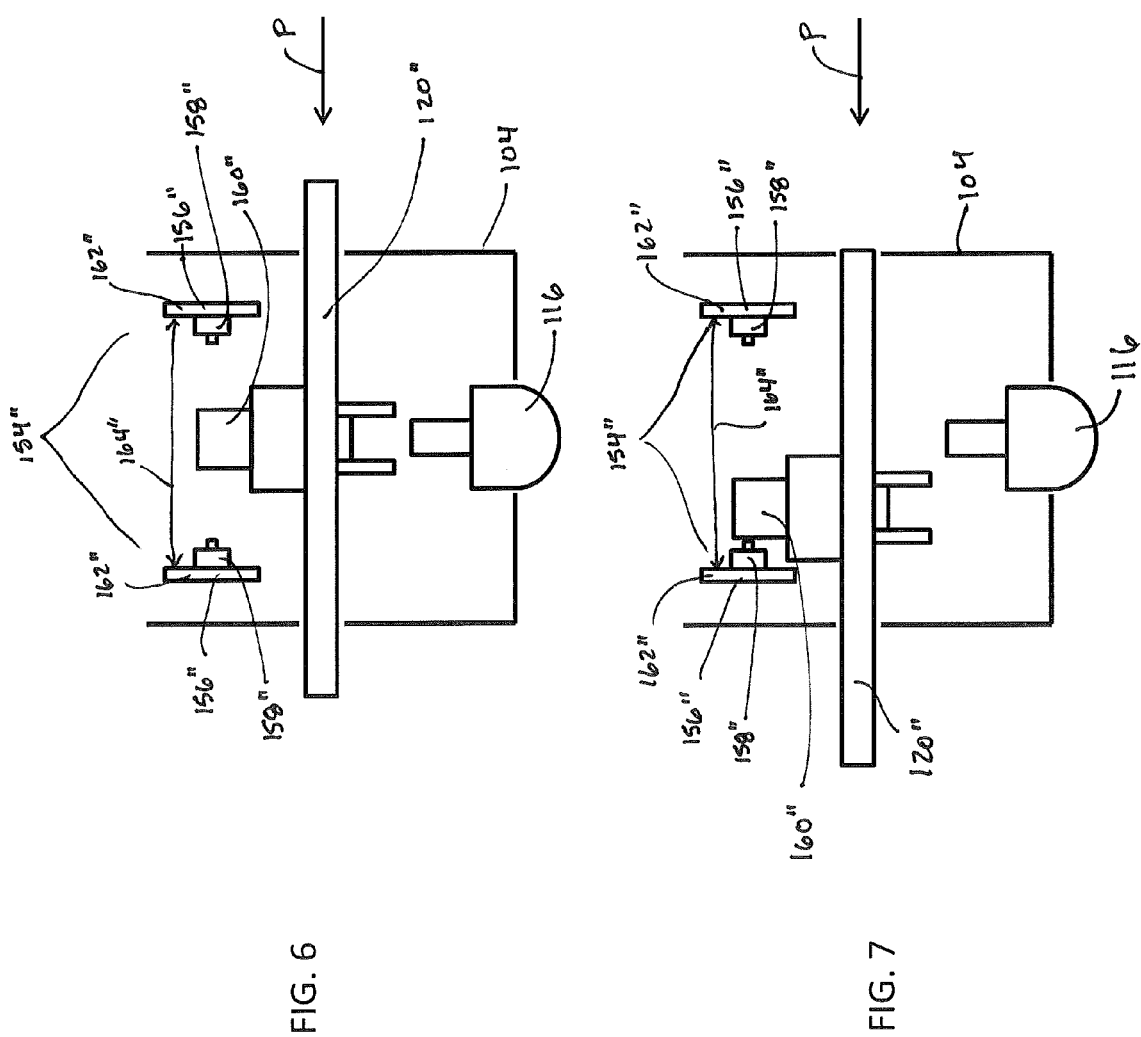

ILLUMINATED POWER TOOLS WITH SWITCH LOCKING ARRANGEMENT

CLAIM OF PRIORITY

This application claims priority to U.S. Provisional Application No. 61/735,584, entitled "Circular Saw with LED Worklight System," which was filed on Dec. 11, 2012, the disclosure of which is incorporated herein by reference in its entirety.

TECHNICAL FIELD

The present disclosure relates generally to the field of hand-held power tools and, more particularly, to power tools having light emitting element systems.

BACKGROUND

Hand-held power tools, such as circular saws, have been popular wood-working tools for many years. In a typical sawing operation, the user begins by marking or otherwise identifying a desired line along which to saw the material to be cut. The user then guides the saw during cutting, manually aligning the blade with the desired line of cut. Maintaining this alignment manually can be difficult because the typical circular saw has a blade guard that obscures the user's view of the blade at the point of cutting and thus impedes the user's ability to accurately align the blade with the desired cutting line. This same difficulty arises with other hand-held power tools, such as routers, coping saws, etc.

To assist in the alignment, circular saws are typically provided with a guide slot that is usually located on the planar cutting base of the saw, and is positioned in front of, and in line with, the circular saw blade. The user then positions the saw so that the line on the material appears in the guide slot. While the provision of such a guide slot does aid the user in proper saw alignment, problems still exist. For example, because the guide slot is located in front of the blade, if the saw blade is not perpendicular relative to the workpiece, the guide slot might be positioned on the cut line while the blade is not. If the user begins to cut the material with the saw in this orientation, it is often difficult to correct the alignment problem. Additionally, because the blade is covered by a blade guard, the user cannot see the blade as it exits the material, and therefore cannot directly monitor the travel of the blade.

Circular saws generally include any number of features meant to address the issues with visibility and alignment to improve the user's efficiency, accuracy, and safety while performing a cutting operation. For example, some circular saws include a lighting device to illuminate the portion of the workpiece being cut curing the cutting operation. Such lighting devices assist the user in manually aligning the circular saw blade with the cutting line drawn on the workpiece by enhancing visibility of the portion of the workpiece being cut. However, current circular saws including lighting devices employ complicated and costly mechanisms to actuate the lighting trigger button. Accordingly, there remains a need for lighting devices in circular saws that are simple and less complicated to implement.

SUMMARY

A power tool includes a working element, and a motor drivingly coupled to the working element. For example, the power tool can be a circular saw including a saw blade. The power tool also includes a motor actuator configured to operate the motor and a housing configured to support the motor and motor actuator. The power tool also includes a light emitting element that is supported by the housing and is configured to illuminate a work area around the working element. A locking element is supported by the housing and movable between a locked position and an unlocked position. In the unlocked position the locking element enables the motor actuator to operate the motor, whereas in the locked position the locking element disables the motor actuator from operating the motor. In one aspect disclosed herein, the power tool includes at least one switch disposed between the housing and the locking element which is configured to operate the light emitting element when the locking element is in the unlocked position.

BRIEF DESCRIPTION OF THE DRAWINGS

FIG. 6 is a schematic depiction of yet another locking element and switch for use in the circular saw of FIG. 1 shown in a locked position.

FIG. 7 is a schematic depiction of the locking element and switch of FIG. 6 in an unlocked position and the switch actuated.

DETAILED DESCRIPTION

Figure 1:
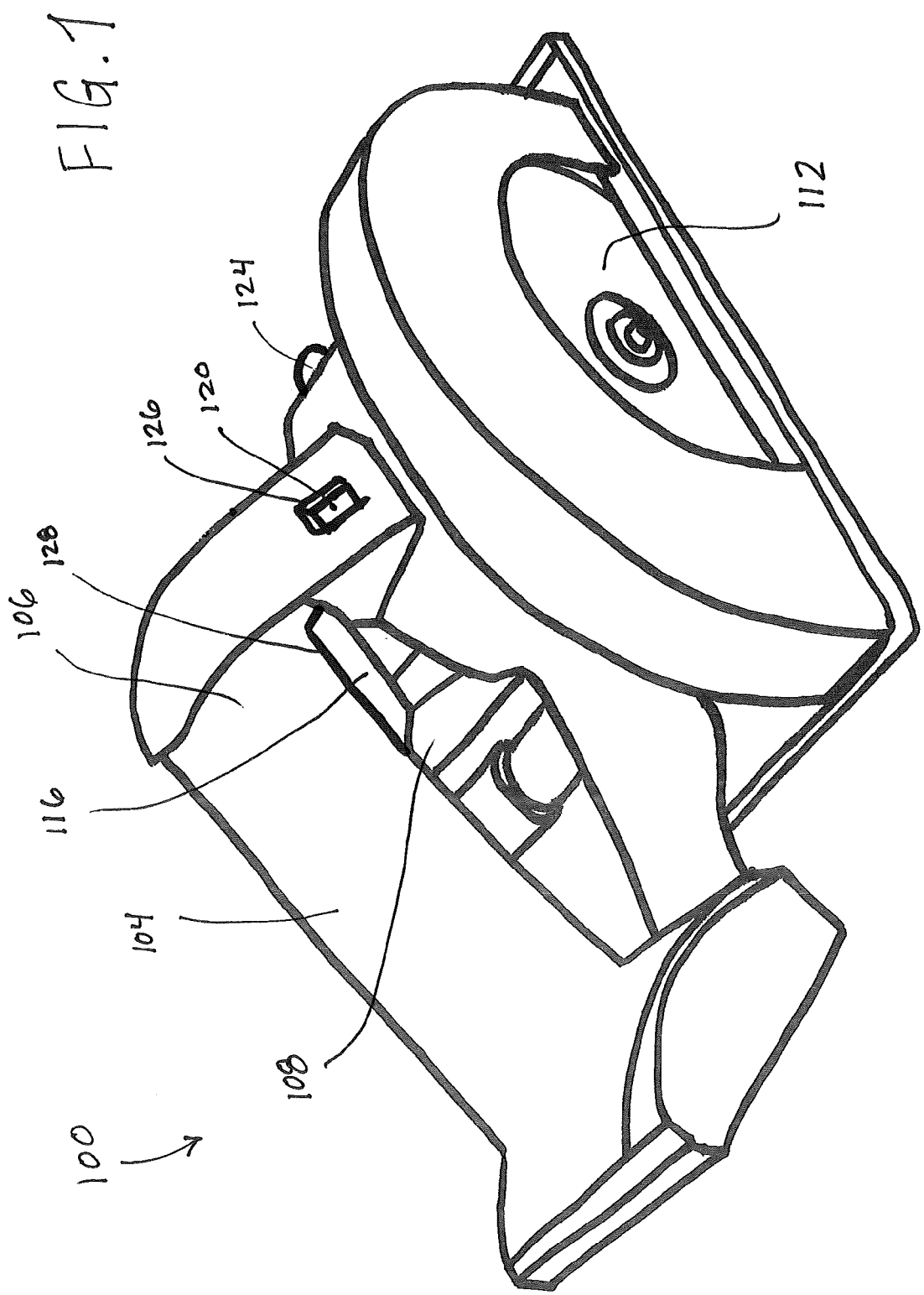
FIG. 1 is a perspective view of a circular saw including a motor actuator.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 depicts an embodiment of a cutting tool 100 having a housing 104, a motor 108, a working element 112, a motor actuator 116, a locking element 120 and a light emitting element 124. The cutting tool 100 can be, for example, a saw, a drill, a tool bit or another device configured to penetrate into a workpiece. For illustrative purposes, the cutting tool 100 illustrated in FIG. 1 is a circular saw. Accordingly, cutting tool 100 is hereinafter also referred to as circular saw 100. Additionally, for illustrative purposes, the working element 112 illustrated in FIG. 1 is a saw blade. Accordingly, working element 112 is hereinafter also referred to as saw blade 112. The housing 104 is substantially hollow and houses electrical and mechanical components which operate the circular saw 100. The motor 108 and motor actuator 116 are connected to and supported by the housing 104 with the motor actuator 116 accessible for a user to operate from outside the housing 104. In one example, the motor actuator 116 is in the form of a trigger that can be depressed to activate the motor as is known in the art. The saw blade 112 is operably connected to the motor 108 such that the actuating motor 108 rotates the saw blade 112 as is known in the art.

The light emitting element 124 is configured and positioned to illuminate a work area surrounding the saw blade 112 when the cutting tool 100 is in use. In the present embodiment, the light emitting element 124 is a light emitting diode. In an alternative embodiment, however, the light emitting element 124 can be any type of element configured to emit light such as, for example, an incandescent bulb or a fluorescent light. In the present embodiment, energy is provided to the light emitting element 124 by the same electrical system providing power to the motor 108. In an alternative embodiment, however, energy can be provided to the light emitting element 124 by a separate energy source or a separate electrical connection. The light emitting element 124 is operated to illuminate the work area to improve the user's visibility of the workpiece being cut and, thus, the accuracy and alignment of the cut. In an alternative embodiment, the housing 104 can include an optical sensor (not shown) in combination with the light emitting element 124. The optical sensor may be configured to illuminate the light emitting element 124 when a workpiece is positioned to be cut and to be actuated automatically when the motor is turned on or when the blade is rotating. Alternatively, the optical sensor can be configured to be actuated manually by the user via an on/off trigger. The optical sensor can be, for example, a light sensor or an ambient light sensing device. The optical sensor can also be configured to illuminate to compensate for poor light in an environment to allow a user to see and cut the workpiece.

The housing 104 includes a handle portion 106 configured to be gripped by the user while operating the circular saw 100. The handle portion 106 includes two locking element openings 126 (only one is visible in FIG. 1) positioned on opposite sides of the housing 104 so as to mirror one another so that the locking element 120 is accessible through both openings. The handle portion 106 also includes a motor actuator opening 128 arranged on an underside of the handle portion 106 through which the actuator 116 projects for access by the user. The locking element openings 126 may be positioned to be easily reached by a user's thumb when grasping the handle portion 106, whether the user grips the handle portion with the right or the left hand. The motor actuator opening 128 is positioned to be easily reached by the user's forefinger when the user is grasping the handle portion 106 to operate the circular saw 100.

Figure 2:
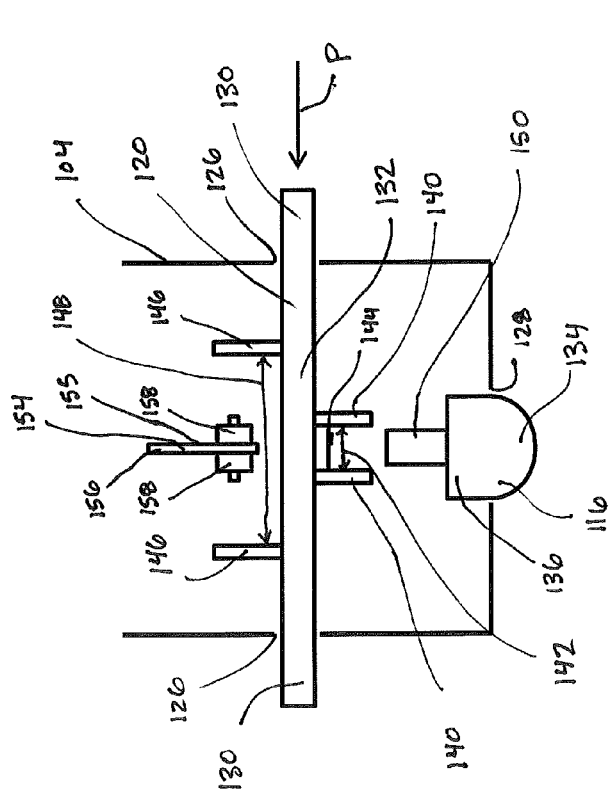
FIG. 2 is a schematic depiction of a locking element for use in the circular saw of FIG. 1 shown in a locked position, and further depicting a switch according to one aspect of the present disclosure.
Figure 3:
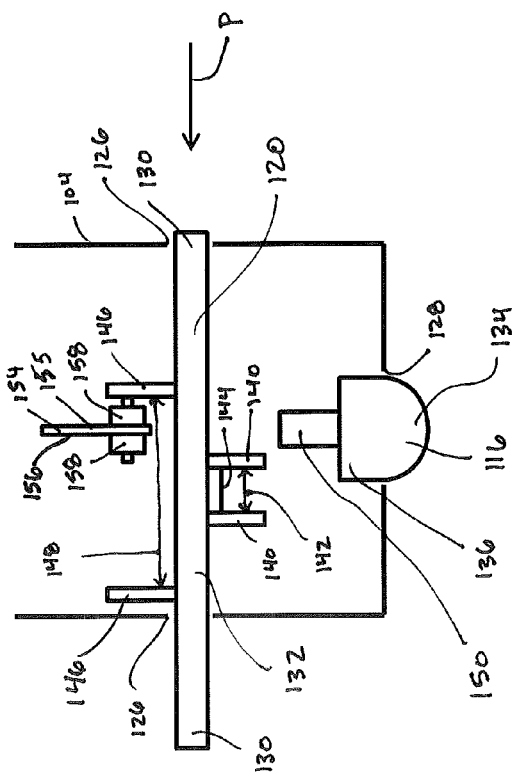
FIG. 3 is a schematic depiction of the locking element of FIG. 2 in an unlocked position and further depicting the switch actuated by the locking element.

Turning to FIGS. 2 and 3, the locking element 120 includes an actuator bar 130, an internal portion 132 arranged along the actuator bar 130, and may further include a biasing or detent member (not shown) operable to hold the actuator bar in a particular position until manually moved by the user. The locking element 120 also includes locking prongs 140 positioned on the internal portion 132 and separated by a locking gap 142 and a locking surface 144 and light actuation prongs 146. The locking element 120 is supported by the housing 104 so as to extend through the locking element openings 126 such that, when the circular saw 100 is assembled as shown in FIG. 1, ends of the actuator bar 130 of the locking element 120 are positioned outside the housing 104 on opposite sides of the housing 104 and the internal portion 132 of the locking element 120 is positioned within the housing 104.

The locking element 120 is further supported by the housing 104 so as to be translationally movable within the locking element openings 126, thereby enabling the locking element 120 to move between a locked position and an unlocked position. When the locking element 120 is in the locked position (shown in FIG. 2), the internal portion 132 of the locking element 120 is centered within the housing 104 such that the ends of the actuator bar 130 of the locking element 120 extend evenly from both sides of the housing 104. By applying pressure P to one of the ends of the actuator bar 130 with the user's thumb, the actuator bar 130 is moved inwardly toward the housing 104 and the locking element 120 is moved toward the unlocked position. When the actuator bar 130 can be pressed no further toward the housing 104, the locking element 120 is in the unlocked position (shown in FIG. 3). Pressure P can be applied to either of the two ends of the actuator bar 130 to move the locking element 120 into the unlocked position. The biasing member or detent may be configured to bias the locking element 120 into the locked position once the actuator bar 130 has moved laterally a sufficient distance. The biasing member or detent may be configured so that an opposite pressure applied to move the locking element 120 back to the locked position must overcome the biasing or detent force.

The motor actuator 116 includes an external portion 134 and an internal portion 136. The internal portion 136 of the motor actuator 116 includes an engaging projection 150. The engaging projection 150 is sized and configured to fit between the locking prongs 140 of the locking element 120. Like the locking element 120, the motor actuator 116 is supported by the housing 104 so as to extend through the motor actuator opening 128 such that, when the circular saw 100 is assembled, the external portion 134 of the motor actuator 116 is positioned outside the housing 104 and the internal portion 136 of the motor actuator is positioned within the housing 104. When the user operates the circular saw 100, the user can easily reach the external portion 134 extending from the underside of the handle portion 106 with his forefinger. The external portion 134 may be configured as a trigger as is known in the art.

The motor actuator 116 is further supported by the housing 104 so as to be pivotably movable within the motor actuator opening 128, thereby enabling the motor actuator 116 to pivot between a non-actuated position, in which the motor actuator 116 is not able to operate the motor 108, and an actuated position, in which the motor actuator 116 is able to operate the motor 108. When the locking element 120 is in the locked position (shown in FIG. 2), the engaging projection 150 is aligned with the locking gap 142. Accordingly, when the motor actuator 116 is pivoted inwardly, toward the actuated position, the engaging projection 150 contacts the locking surface 144, thereby preventing the motor actuator 116 from entering the actuated position and retaining the motor actuator 116 in the non-actuated position such that the motor actuator 116 is not able to actuate the motor 108 to operate the saw blade 112. Conversely, when the locking element 120 is in the unlocked position (shown in FIG. 3), the engaging projection 150 is not aligned with the locking gap 142. Accordingly, the motor actuator 116 is able to be pivoted inwardly without interference into the actuated position, such that the motor actuator 116 is able to actuate the motor 108 to operate the saw blade 112 of the circular saw 100.

The circular saw 100 further includes a switch element 154 disposed between the housing 104 and the locking element 120. In one embodiment, the switch element 154 is supported by a rib 155 within the housing 104 and configured to extend into a gap 148 between the light actuation prongs 146 positioned on the internal portion 132. The switch element 154 may include a printed circuit board 156 and two micro-electro-mechanical (MEM) switches 158 surface mounted to the printed circuit board 156. The printed circuit board is electrically connected to the light emitting element 124 such that actuation of either of the switches 158 operates the light emitting element 124. The switches 158 are mounted on opposite sides of the printed circuit board 156 such that the switches 158 are positioned opposite one another and face away from one another, and more importantly the switches 158 are positioned to face a corresponding one of the light actuation prongs 146.

When the locking element 120 is positioned in the locked position (shown in FIG. 2), the light actuation prongs 146 are spaced apart from the switches 158 and the light emitting element 124 (shown in FIG. 1) is not operated. When the locking element 120 is moved into the unlocked position (shown in FIG. 3), one of the light actuation prongs 146 comes into contact with one of the MEM switches 158, thereby electrically operating the light emitting element 124 (shown in FIG. 1). Accordingly, when a user moves the locking element 120 to unlock the circular saw 100 to enable operation of the motor actuator 116 to actuate the motor 108 and operate the saw 100, the user also automatically operates the light emitting element 124 to illuminate the work area surrounding the saw blade 112. In an alternative embodiment, the printed circuit board 156 can also be movable relative to the housing 104 such that the light emitting element 124 can also be operated by moving the printed circuit board 156 without moving the locking element 120. In this embodiment, the printed circuit board 156 can be moved laterally to depress one of the MEM switches against the stationary light actuation prong 146. The printed circuit board 156 may thus be supported on an actuator that is externally accessible on the housing 104. In another alternative embodiment, the switch element 154 can include a single switch 158 surface mounted to the printed circuit board 156 instead of two switches 158. The single switch 158 is configured and positioned such that it can be contacted by either of the light actuation prongs 146 to operate the light emitting element 124.

Figure 4:
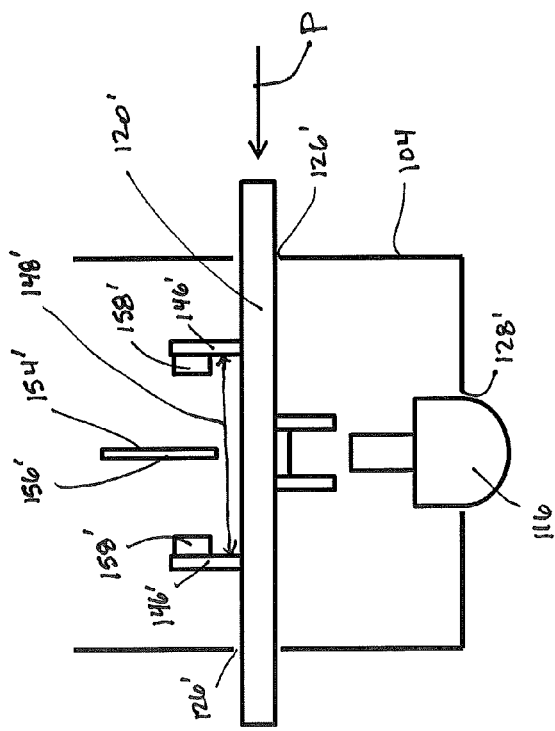
FIG. 4 is a schematic depiction of another locking element and switch for use in the circular saw of FIG. 1 shown in a locked position.
Figure 5:
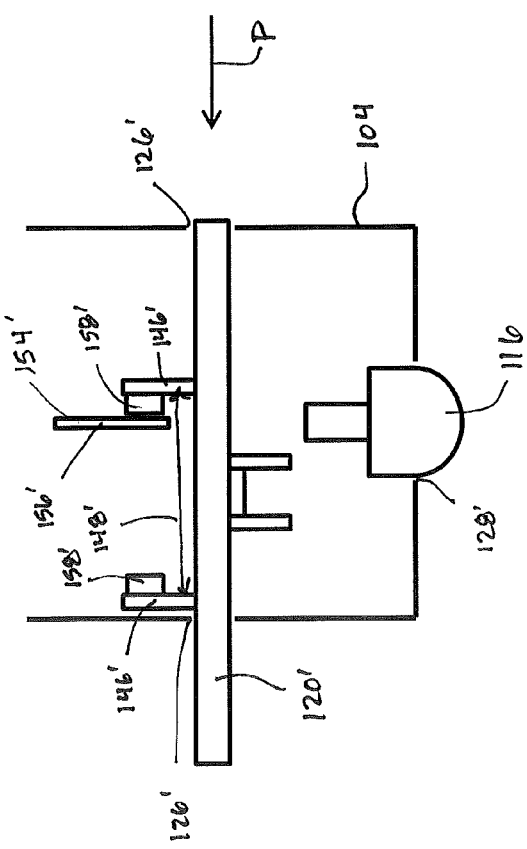
FIG. 5 is a schematic depiction the locking element and switch of FIG. 4 in an unlocked position and the switch actuated.

Turning now to FIGS. 4 and 5, a locking element 120' and a switch element 154' are shown. The locking element 120' and switch element 154' are substantially similar to the locking element 120 and switch element 154 shown in FIGS. 2 and 3. However, the locking element 120' includes capacitive electrode switches 158' mounted to the light actuation prongs 146' and the switch element 154' does not include MEM switches. The capacitive electrode switches 158' are positioned opposite one another, separated by the gap 148', face toward one another and more importantly face the printed circuit board 156' situated between the light actuation prongs 146'.

In use, the light emitting element 124 (shown in FIG. 1) is operated by moving the locking element 120' between the locked position (shown in FIG. 4) and the unlocked position (shown in FIG. 5). When the locking element 120' is in the locked position (shown in FIG. 4), the light actuation prongs 146' are spaced apart from the printed circuit board 156' and the light emitting element 124 is not operated. When the locking element 120' is moved to the unlocked position (shown in FIG. 5), one of the switches 158' on one of the light actuation prongs 146' contacts the printed circuit board 156' thereby operating the light emitting element 124 (shown in FIG. 1). In an alternative embodiment, the printed circuit board 156' can also be movable relative to the housing 104 such that the light emitting element 124 (shown in FIG. 1) can also be operated by moving the printed circuit board 156' without moving the locking element 120'.

Turning now to FIGS. 6 and 7, a locking element 120" and a switch element 154" are shown. The locking element 120" and switch element 154" are substantially similar to the locking element 120 and switch element 154 shown in FIGS. 2 and 3 and described above. However, the locking element 120" does not include the light actuation prongs and gap and instead includes an actuation rib 160". The switch element 154" includes light actuation prongs 162", supported by the housing 104, and a gap 164" separating the two light actuation prongs 162". The actuation rib 160" is configured and positioned to extend into the gap 164" between the light actuation prongs 162". Each of the light actuation prongs 162" may include a printed circuit board 156" electrically connected to the light emitting element 124 (shown in FIG. 1) and a micro-electro-mechanical switch 158" surface mounted to the printed circuit board 156". The switches 158" are positioned opposite one another, separated by the gap 164" and facing toward one another and toward the actuation rib 160".

In use, the light emitting element 124 (shown in FIG. 1) is operated by moving the locking element 120" between the locked position (shown in FIG. 6) and the unlocked position (shown in FIG. 7). When the locking element 120' is in the locked position (shown in FIG. 6), the actuation rib 160" is spaced apart from the printed circuit boards 156" and the light emitting element 124 is not operated. When the locking element 120" is moved to the unlocked position (shown in FIG. 7), the actuation rib 160" contacts one of the switches 158" on one of the printed circuit boards 156" supported by the housing 104, thereby operating the light emitting element 124 (shown in FIG. 1).

Figures 8, 9:
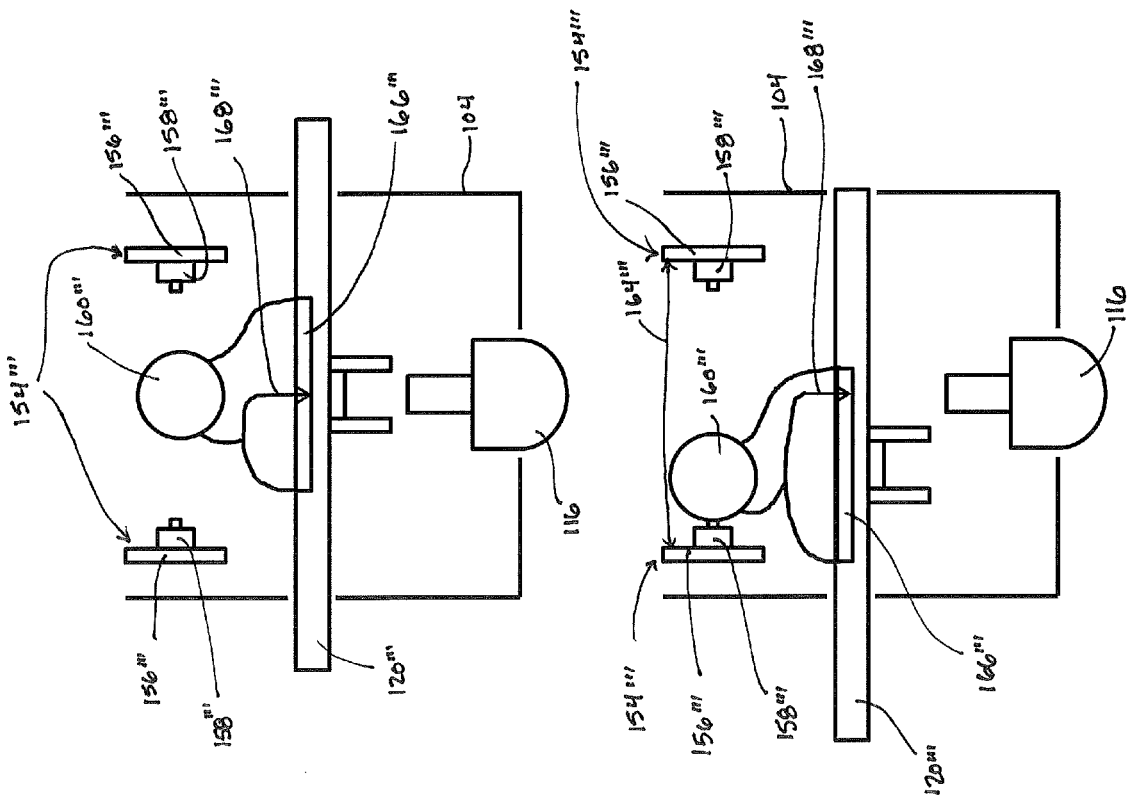
FIG. 8 is a schematic depiction of a further locking element and switch for use in the circular saw of FIG. 1 shown in a locked position.
FIG. 9 is a schematic depiction of the locking element and switch of FIG. 8 in an unlocked position and configured to operate a light emitting element.

Turning now to FIGS. 8 and 9, a locking element 120''' and a switch element 154''' are shown. The locking element 120''' and switch element 154''' are substantially similar to the locking element 120" and switch element 154" shown in FIGS. 6 and 7 and described above. However, the locking element 120''' includes a variable resistor 166''' and circuit wiper 168''' configured to control activation of an actuator 160''' within the gap 164'''. When activated, the actuator moves toward one of the light actuation prongs 162''' to thereby activate the lighting emitting element 124. The actuator 160''' is thus configured to move independently of the locking element 120'''. When the locking element 120''' is in the locked position (shown in FIG. 8), the actuator 160''' is spaced apart from the printed circuit boards 156''' and the MEM switches 158'''. In this position, the circuit wiper 168''' is oriented in the center of the variable resistor 166''' so that the current provided to the actuator 160''' is not sufficient to cause the actuator to move. When the locking element 120''' is moved to the unlocked position (shown in FIG. 9), the circuit wiper 168''' contacts the variable resistor 166''' at a different location so that sufficient current is provided to activate the actuator 160''' to move into contact with one of the MEM switches 158''' to thereby activate the light emitting element 124. The actuator 160''' may be a solenoid or similar electrical component that requires a threshold current to be activated.

The arrangements of the circular saw 100 as described above are advantageous because the locking element 120, 120', 120", or 120''' is a safety switch which the user must move before the user can actuate the motor actuator 116. This promotes safety by decreasing the chance that the user unintentionally actuates the motor actuator 116 and unintentionally operates the circular saw 100. Additionally, these arrangements are advantageous because the user operates the light emitting element 124 using a single integrated direct contact actuation mechanism rather than a costly, complex mechanism. Moreover, the switch elements 154, 154', 154", 154''' eliminate the need for a separate switch to activate a light, which can take the user's attention away from the power tool. These arrangements are further advantageous because they are able to be actuated by a user with either his right or his left hand, improving versatility and usability.

In other embodiments, the printed circuit boards of the prior embodiments can be flexible circuits, foldable circuits, ceramic substrates, thin film multichip module substrates, prefolded substrates, a combination thereof, or another substrate material having similar properties. In other embodiments, the micro-electro-mechanical switches of the prior embodiments can be micro-electro-mechanical system switch-like elements such as cantilever beams, torsional beams, sliding disks, and other micro-electo-mechanical elements which are well known in the art. In other alternative embodiments, the micro-electo-mechanical elements can be joystick movement micro-electo-mechanical sensors. The micro-electo-mechanical switches can be controllable by a variety of means known in the art, including but not limited to electrostatic means, capacitive means, magnetic means, or piezoelectric means. In yet other embodiments, the switches can be fabricated and integrated within the circuit boards.

In at least one embodiment, the light emitting element 124 is configured to emit light at a variety of intensity levels. In one embodiment, the light emitting element 124 emits light at a "low" intensity level when the user is not depressing the locking element 120, 120', 120", or 120''' and emits light at a "high" intensity level when the user is depressing the locking element 120, 120', 120", or 120'''. In another embodiment, the light emitting element 124 emits light with gradually increasing intensity when the user has depressed the locking element 120, 120', 120", or 120''' and is depressing the motor actuator 116. In another embodiment, the light emitting element 124 emits light at a "high" intensity level when the user is depressing the motor actuator 116 and emits light at a "low" intensity level when the user releases the motor actuator 116. In another embodiment, the light emitting element 124 emits light at a "high" intensity level when the user is depressing the motor actuator 116 and emits light in flashes when the user releases the motor actuator 116. In this embodiment, the light emitting element 124 emits light at a "low" intensity level after emitting light in a predetermined number of flashes.

In the embodiments described herein, the light emitting element is able to be actuated by movement in either a right or a left direction. In alternative embodiments, the light emitting element can be actuated in the same manner but only by movement in one of the right or left direction.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. A power tool, comprising:
   a working element;
   a motor drivingly coupled to the working element;
   a motor actuator configured to operate the motor;
   a housing configured to support the motor and motor actuator;
   a light emitting element supported by the housing and configured to illuminate a work area around the working element;
   a locking element supported by the housing so as to be movable between a locked position and an unlocked position, the locking element configured to enable the motor actuator when positioned in the unlocked position and configured to disable the motor actuator when positioned in the locked position; and
   a switch element configured to operate the light emitting element when the locking element is in the unlocked position, the switch element disposed between the housing and the locking element and operable in relation to movement of the locking element, the switch element including two switches positioned opposite one another and an actuation element associated with the locking element and movable to activate either of the two switches.

2. The power tool of claim 1, wherein the two switches face toward one another and the actuation element is interposed between the two switches.

3. The power tool of claim 1, wherein the two switches face away from one another and the actuation element is surrounding the two switches.

4. The power tool of claim 1, wherein the locking element includes a biasing member coupled to the locking element and configured to bias the locking element toward the locked position.

5. The power tool of claim 1, wherein:
   the switch element further includes a variable resistor associated with the locking element and electrically connected to and configured to activate the actuation element, and
   the actuation element is configured to operate either of the switches when the locking element is in the unlocked position.

6. The power tool of claim 1, wherein the actuation element is movable to activate either of the two switches when the locking element is in the unlocked position.

7. The power tool of claim 6, wherein the switches are supported by the housing and configured such that one of the switches is operated by the actuation element when the locking element is in the unlocked position.

8. The power tool of claim 1, wherein:
   the switch element includes two prongs associated with the locking element and spaced apart from one another by a gap,
   the switch element further includes a rib supported by the housing and positioned in the gap such that the rib contacts a first of the two prongs when the locking element is moved in a first direction and contacts a second of the two prongs when the locking element is moved in a second direction.

9. The power tool of claim 8, wherein the switches are positioned on the prongs facing one another on opposite sides of the gap, and the switches are configured to be operated by the rib when the rib contacts the prongs.

10. The power tool of claim 8, wherein the switches are positioned on the rib facing away from one another toward opposite prongs, and the switches are configured to be operated by the prongs when the prongs contact the rib.

11. The power tool of claim 1, wherein:
the switch element includes two prongs supported by the housing and spaced apart from one another by a gap, and
the switch element further includes a rib associated with the locking element and positioned in the gap such that the rib contacts a first of the two prongs when the locking element is moved in a first direction and contacts a second of the two prongs when the locking element is moved in a second direction.

12. The power tool of claim 11, wherein the switches are positioned on the prongs facing one another on opposite sides of the gap, and the switches are configured to be operated by the rib when the rib contacts the prongs.

13. The power tool of claim 11, wherein the switches are positioned on the rib facing away from one another toward opposite prongs, and the switches are configured to be operated by the prongs when the prongs contact the rib.

14. The power tool of claim 1, wherein:
the switches are micro-electro-mechanical (MEM) switches; and
the actuation element is movable to activate either of the MEM switches when the locking element is in the unlocked position.

15. The power tool of claim 14, wherein:
the switch element further includes a printed circuit board electrically connected to the light emitting element, and
the MEM switches are surface mounted to the printed circuit board.

16. The power tool of claim 15, wherein the printed circuit board is movable relative to the housing to activate the MEM switches with the actuation element.

\* \* \* \* \*